Oct. 22, 1929.  B. CHRISTIANSEN  1,732,672
METHOD OF ROASTING AND REDUCING ORES
Filed Jan. 6, 1923
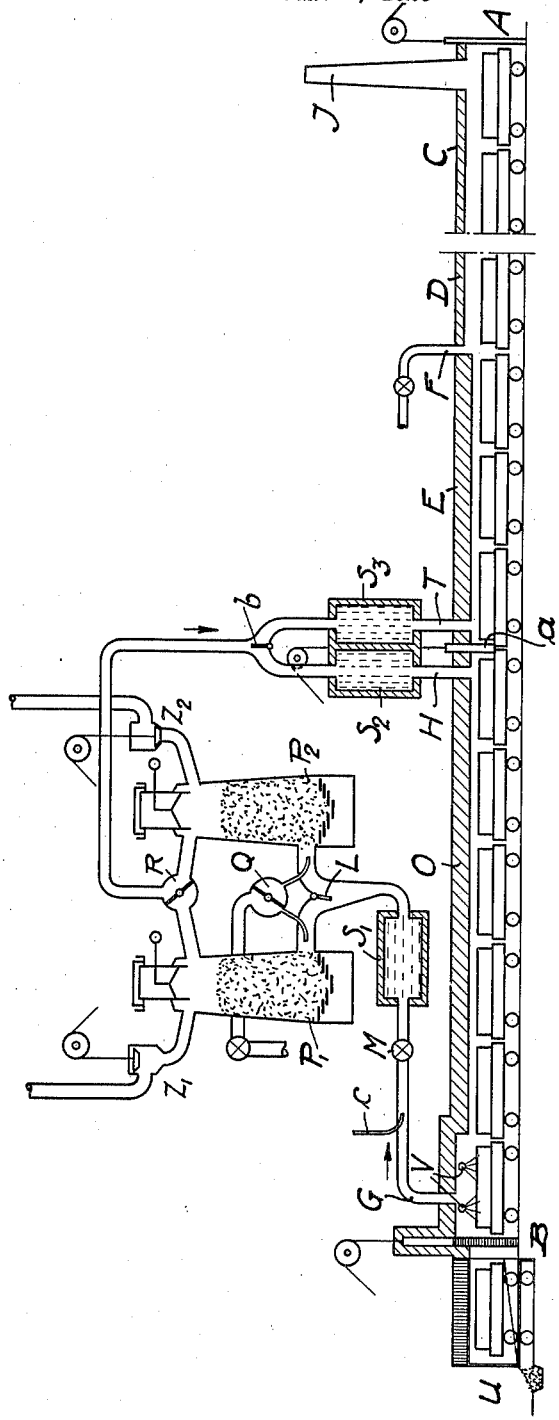

Patented Oct. 22, 1929

1,732,672

UNITED STATES PATENT OFFICE

BROR CHRISTIANSEN, OF SMEDJEBACKEN, SWEDEN

METHOD OF ROASTING AND REDUCING ORES

Application filed January 6, 1928, Serial No. 244,962, and in Norway January 29, 1927.

In my copending application Ser. No. 98,347 I have described a method of reducing ores, especially iron ores, in which the ore loaded on carriages is fed through a channel furnace and subjected successively to preheating, roasting, prereduction and final reduction operations. In said method the final reduction of the ore is carried out by means of circulating reducing gases which outside the furnace are regenerated by means of alternately operative recarbonizing furnaces, the excess of gas formed in the circulation system being drawn off and partially combusted in the momentarily inoperative recarbonizing furnace by a regulated supply of air for reheating said furnace and the combustion gases escaping from said latter furnace being supplied to the pre-reduction zone of the channel furnace and finally combusted by an excess of air in the roasting and preheating zones.

The chief object of this invention is to modify said method in order to obtain a more rapid and effective reheating of the momentarily inoperative recarbonizing furnace, the modification consisting, chiefly, in this that the reheating of said recarbonizing furnace is effected by such a plentiful supply of combustion air that the combustion gases escaping from said furnace consist essentially of carbon dioxide and nitrogen, said combustion gases being carried off to the atmosphere, and the prereduction being effected by means of the excess of the regenerated circulating gas.

In the accompanying drawing, I have shown diagrammatically a longitudinal vertical section of a channel furnace adapted for the performing of the invention.

Referring to the drawing, A designates the introduction end and B the discharge end of the channel furnace. Nearest to the introduction end A is a preheating zone C and then a roasting zone D and a prereduction zone E follow. Through the introduction end carriages made of refractory material and loaded with the ore to be treated are successively introduced into the furnace. The ore loaded on the carriages is, preferably, in the form of pressed cakes or blocks. At T a mixture of carbon monoxide and hydrogen obtained from the recarbonizing furnaces herebelow described is supplied and at F an excess of preferably preheated air is supplied by means of which the gas supplied at T is combusted in the zone D whereupon the combustion gases pass the zone C and escape through the chimney I. In the zone C a preheating of the ore takes place by the hot combustion gases and the temperature of the ore rises the nearer the carriages come to the inner end of the zones C, D. By this preheating the ore cakes are in well-known manner converted into harder briquettes.

The combustion zone is in direct communication with the prereduction zone E. The desulphurized and oxidized incandescent briquettes introduced in the zone E are here met by the gas introduced at T and containing carbon monoxide and hydrogen. The gas is preheated, if necessary, before it enters the zone E and its temperature may be, for instance, 1100° C. As the briquettes already at their entrance into the zone E have a temperature sufficiently high for the reduction this process takes place immediately, a part of the oxygen of the ore being combined with a part of the carbon monoxide and hydrogen to carbon dioxide and steam respectively.

In the prereduction zone the briquettes are converted partly to FeO and partly to spongy iron. The prereduction zone E is separated from the final reduction zone O by means of a shutter $a$, which can be elevated momentarily when the carriages are moved forward.

In the final reduction zone a current of carbon monoxide and hydrogen is introduced at H, the temperature of which may be for instance 1000° C. at the entrance. Said gas flows in the final reduction zone in the same direction as the briquettes are moved and is taken out at G. M is a fan for maintaining the circulation of the gas. As the briquettes still have a temperature suitable for the performance of the reduction such process is continued, the remaining oxygen of the briquettes being combined with a part of the carbon monoxide into carbon dioxide and with the hydrogen into steam. Said reduction ceases, however, when at the prevailing temperature a corresponding equilibrium is obtained between the carbon dioxide, carbon monoxide, hydrogen and steam present.

The gas having passed through the final reduction zone O is taken out at G and supplied to two recarbonizing furnaces $P_1$ and $P_2$, filled with coke or other fuel. Said furnaces are operated alternately in such manner that one is reheated while the other delivers its heat to the circulating gas for the strongly endothermic reaction

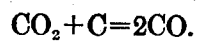

$$CO_2 + C = 2CO.$$

By a shiftable distribution valve Q air can be supplied to either of the recarbonizing furnaces and by means of another shiftable valve R the circulating gas can be supplied to the final reduction zone. A valve L distributes the quantities of circulating gas from G to the recarbonizing furnaces $P_1$ and $P_2$ at will.

When the valves are in the positions shown in the drawing a portion of the circulating gas, which contains hydrogen and carbon monoxide and escapes at G, is introduced into $P_1$. The supply of air is regulated in such manner that said gas is completely combusted. Also a portion of the solid fuel is then combusted by direct combustion with the air abundantly supplied, $CO_2$ being substantially formed. The combustion gases essentially consisting in $CO_2$, $N_2$ and $H_2O$ escape through the chimney $Z_1$. Simultaneously the chief part of the circulating gas is introduced into $P_2$ and regenerated and finally distributed by the valve b.

When the reduction gas is passed through the incandescent carbon layer its content of carbon dioxide is reduced by the carbon into carbon monoxide and the steam into carbon monoxid and hydrogen, so that the gas escaping from the recarbonizing furnace consists, chiefly, in carbon monoxide and hydrogen, which through the valve R is returned to the channel furnace through the gas inlets H and T.

The greater part of the circulating gas is introduced in the furnace at H, the remaining part which corresponds to the excess, being introduced at T and flowing further on as described above.

The heat, which is necessary for the reaction is taken from the heat accumulated in the fuel. When the temperature of the fuel has decreased in such a degree that the formation of carbon monoxide begins to cease the valves O and R are reversed and the valve L is also adjusted to a new position, if desired, $P_2$ being thus reheated and $P_1$ delivering heat to the circulating gas.

Before the gas enriched as to carbon monoxide and hydrogen is introduced at H, it can be conveyed through a heating apparatus $S_2$ for raising its temperature in a required degree. The preheating of the gas introduced at T may take place in a heating apparatus $S_3$, while the preheating of the circulating gas escaping from G is performed in a heating apparatus $S_1$, before it enters the recarbonizing furnaces.

The cooling of the spongy iron produced may, for instance, be performed by means of a cooling carriage U, which is cooled by means of external water sprayers.

When the circulating gas is removed at G, the cooling of the ready briquettes may also be performed by means of water sprayers V at the discharge end of the channel furnace. At the contact with the hot briquettes the water is converted into steam, which follows the circulating gas escaping from the furnace through the gas outlet G. The portion of the circulating gas, which is introduced into the recarbonizing furnace just operated, has its content of steam converted into hydrogen and carbon monoxide according to the formula: $C + H_2O = H_2 + CO$. The gas supplied into the reduction furnace at H thus will contain a certain percentage of hydrogen. Said percentage of hydrogen may be increased by direct supply of water through water sprayers, steam jets, or the like into the piping for the circulating gas, as shown at c.

What I claim is:

1. Method of reducing ores, which comprises transporting the ore successively through preheating, roasting, prereduction and final reduction zones of a channel furnace, subjecting the ore in the final reduction zone to the reducing action of circulating reducing gases, recarbonizing said gases outside the furnace in alternately operative recarbonizing furnaces containing incandescent layers of carbon, reheating the momentarily inoperative recarbonizing furnace by a plentiful supply of air supplied through its layer of carbon while discharging the combustion gases formed into the atmosphere, returning a portion of the recarbonized gases to the final reduction zone, supplying another portion thereof to the prereduction zone and finally combusting it by an excess of air in the roasting zone of the channel furnace.

2. Method of reducing ores, which comprises transporting the ore successively through preheating, roasting, prereduction and final reduction zones of a channel furnace, subjecting the ore in the final reduction zone to the reducing action of circulating reducing gases, recarbonizing said gases outside the channel furnace in alternately operative recarbonizing furnaces containing incandescent layers of carbon, supplying a portion of the circulating gas to the momentarily inoperative furnace and combusting it therein together with a portion of the solid carbon by a plentiful supply of air for reheating said furnace while discharging the combustion gases formed into the atmosphere, returning a portion of the recarbonized gases to the final reduction zone, and supplying another portion thereof to the prereduction zone and finally combusting it by an excess of air in the roasting zone of the channel furnace.

3. Method of reducing ores, which comprises transporting the ore successively through preheating, roasting, prereduction and final reduction zones of a channel furnace, subjecting the ore in the final reduction zone to the reducing action of circulating reducing gases, mixing the circulating gas escaping from the final reduction zone with steam and recarbonizing said mixture outside the channel furnace in alternately operative recarbonizing furnaces containing incandescent layers of carbon, reheating the momentarily inoperative recarbonizing furnace by a plentiful supply of air supplied through its layer of carbon while discharging the combustion gases formed into the atmosphere, returning a portion of the recarbonizing gases to the final reduction zone, and supplying another portion thereof to the prereduction zone and finally combusting it by an excess of air in the roasting zone of the channel furnace.

4. Method of reducing ores, which comprises transporting the ore successively through preheating, roasting, prereduction and final reduction zones of a channel furnace, subjecting the ore in the final reduction zone to the reducing action of circulating reducing gases, cooling the reduced ore by water sprays, drawing off the steam formed together with the reducing gases from the final reduction zone and recarbonizing said mixture outside the channel furnace in alternately operative recarbonizing furnaces containing incandescent layers of carbon, reheating the momentarily inoperative recarbonizing furnace by a plentiful supply of air supplied through its layer of carbon while discharging the combustion gases formed into the atmosphere, returning a portion of the recarbonized gases to the final reduction zone, and supplying another portion thereof to the prereduction zone and finally combusting it by an excess of air in the roasting zone of the channel furnace.

In testimony whereof I have signed my name.

BROR CHRISTIANSEN.